Sept. 20, 1966  C. R. LYLES  3,273,504
WELL PUMPING PROCESS AND APPARATUS THEREFOR
Filed July 26, 1965  4 Sheets-Sheet 1
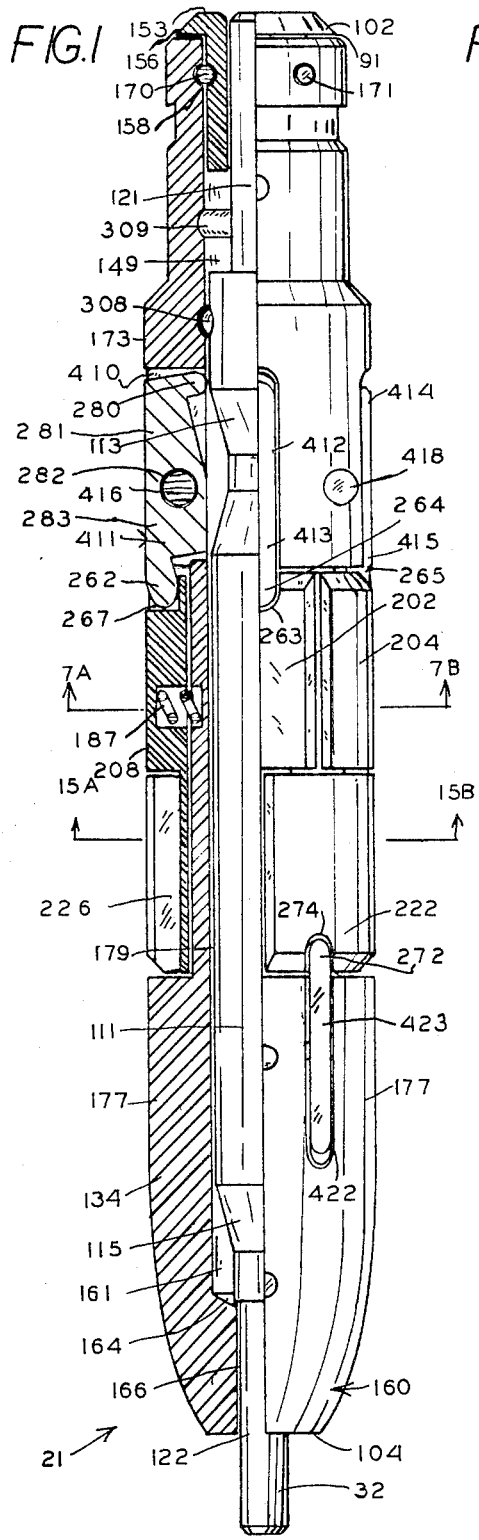
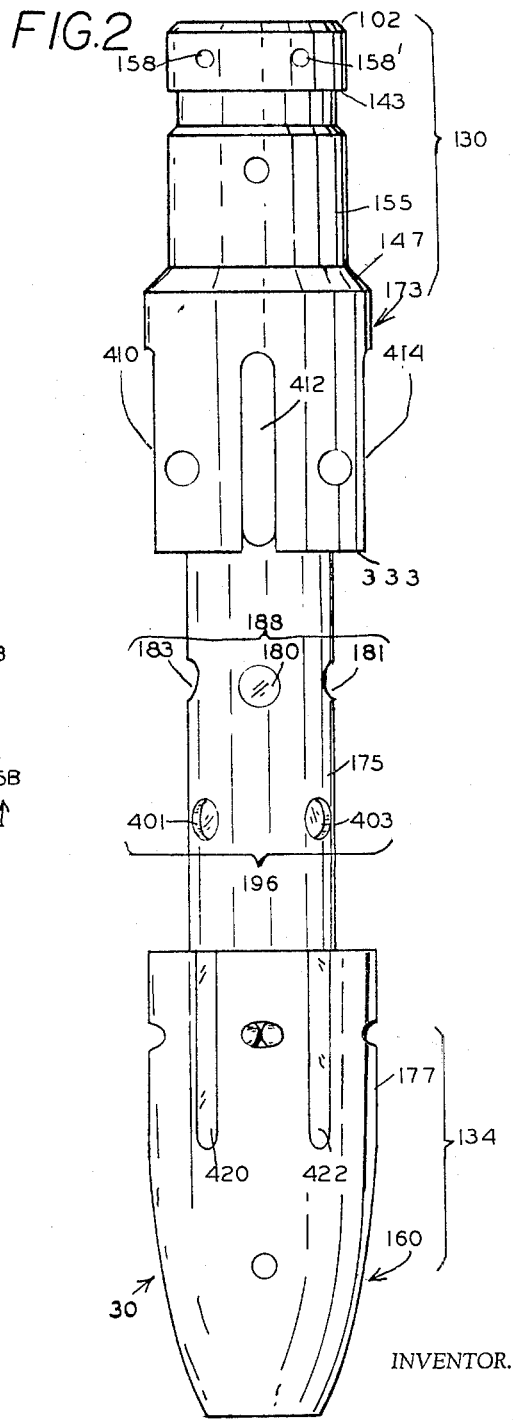
INVENTOR.
C. R. LYLES
BY Ely Silverman
ATTORNEY Sept. 20, 1966  C. R. LYLES  3,273,504
WELL PUMPING PROCESS AND APPARATUS THEREFOR
Filed July 26, 1965  4 Sheets-Sheet 2

C.R. LYLES
INVENTOR.

BY Ely Silverman
ATTORNEY

Sept. 20, 1966 C. R. LYLES 3,273,504
WELL PUMPING PROCESS AND APPARATUS THEREFOR
Filed July 26, 1965 4 Sheets-Sheet 3
FIG. 5
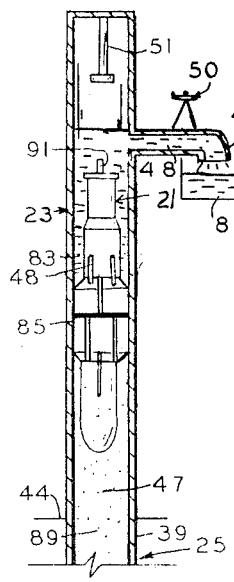
FIG. 6
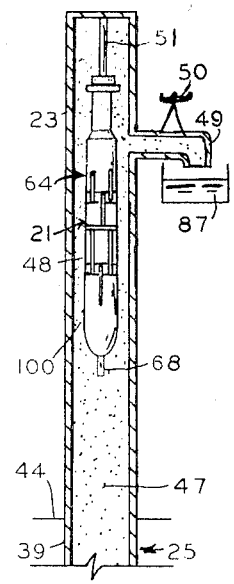
FIG. 7
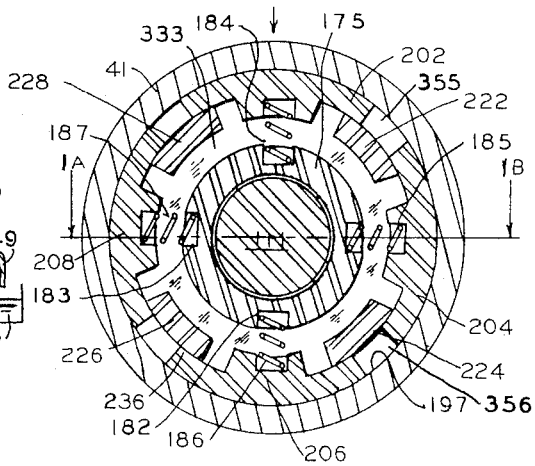
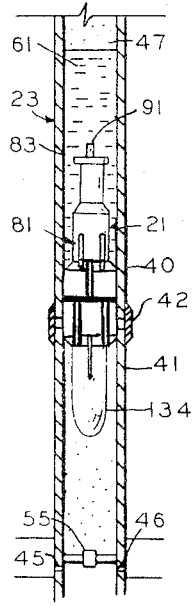
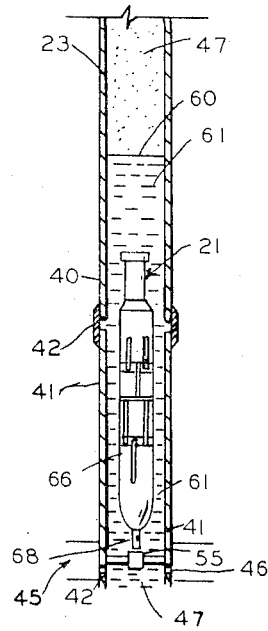
FIG. 8
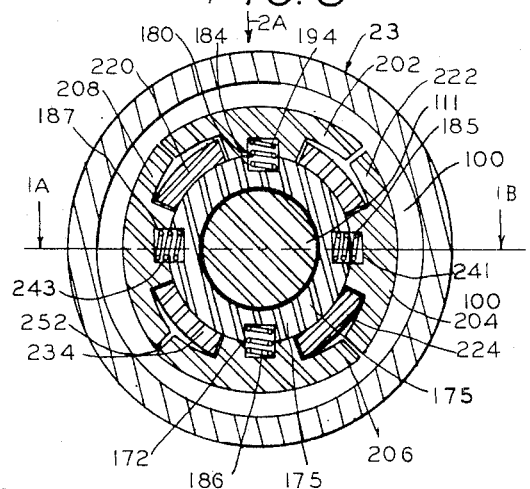
C.R. LYLES
INVENTOR.
BY Ely Silverman
ATTORNEY Sept. 20, 1966  C. R. LYLES  3,273,504
WELL PUMPING PROCESS AND APPARATUS THEREFOR
Filed July 26, 1965  4 Sheets-Sheet 4

INVENTOR.
C.R. LYLES
BY Ely Silverman
ATTORNEY

United States Patent Office 3,273,504
Patented Sept. 20, 1966

1

3,273,504
WELL PUMPING PROCESS AND APPARATUS
THEREFOR
Cecil Ray Lyles, 2101 E. 16th St., Farmington, N. Mex.
Filed July 26, 1965, Ser. No. 474,573
2 Claims. (Cl. 103—52)

This is a continuation-in-part of my co-pending patent application Serial No. 358,807, filed Apr. 10, 1964.

This invention relates to a process of pumping oil and gas wells and to an apparatus adapted to raise well fluid from the bottom of such wells for use in such process.

One object of this invention is to provide an improved external bypass gas-lift apparatus.

Another object of this invention is to provide a sturdy gas-lift piston plunger providing a minimum number of parts and an improved seal and means for automatically reversing its direction of travel at the upper and lower limits of its travel.

Other objects of this invention will become apparent to those skilled in the art upon study of the below description, of which description the hereto attached drawings form a part and in which drawings the same numbers refer to the same parts throughout all the drawings and wherein:

FIGURE 1 is in part a cross-sectional view along section 1A–1B of FIGURE 16 and partly side view along arrow 4A of FIGURE 16 of an apparatus according to this invention shown in its contracted condition;

FIGURE 2 is a side view of the frame subassembly 30 of the invention;

FIGURE 5 is a diagrammatic representation of the apparatus of FIGURE 1 during the operation of that apparatus in a well tubing and showing that apparatus in two of its operative positions therein with its sealing means in its expanded condition;

FIGURE 6 is a diagrammatic representation of the apparatus of FIGURE 1 during its operation in a well tubing in two of its positions therein with the sealing means of that apparatus shown in its contracted condition;

FIGURE 7 is a transverse cross-sectional view of the apparatus shown in FIGURE 1 in its expanded condition taken along the plane shown as section 7A–7B of FIGURE 1;

FIGURE 8 is a transverse cross-sectional view of the apparatus shown in FIGURE 1 in its contracted condition, this view being taken along the plane shown as section 7A–7B of FIGURE 1;

2

Figure 15:
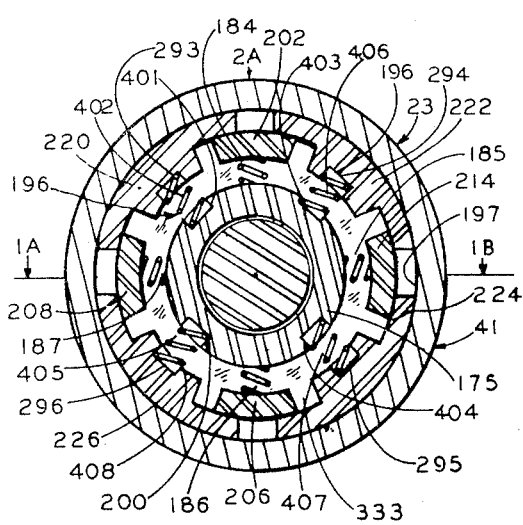
Figure 16:
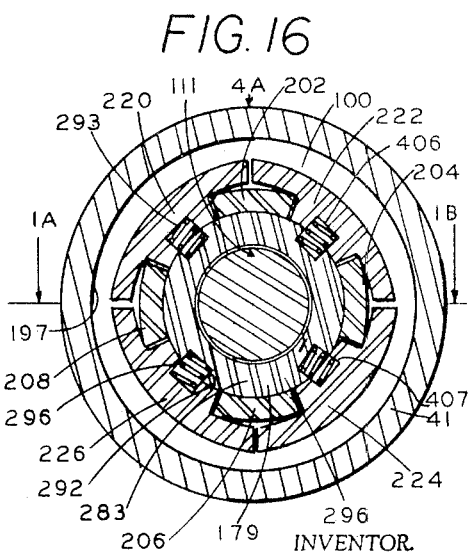

FIGURE 15 is a transverse cross-sectional view of the apparatus as shown in FIGURE 1 in its expanded condition as seen along the plane shown as section 15A–15B; and FIGURE 16 is a transverse cross-sectional view of the apparatus as shown in FIGURE 1 as seen along the plane shown as section 15A–15B of FIGURE 1.

The apparatus of FIGURE 1, generally indicated as 21, comprises a frame subassembly 30, a piston subassembly 32, and a sealing subassembly 34.

The apparatus 21 is intended to operate in a well, generally shown as 25. The well comprises a tubing string 23, which is composed of lengths of tubing as 39, 40 and 41 with adjacent lengths, as 40 and 41 joined by collars, as 42. The tubing string has conventional perforations as 46 at the level of the formation 45 which permits communication and transport of the formation fluids and gases to the interior 47 of the well string. The tubing string is provided with a discharge orifice 48 leading to a discharge outlet 49 above the level of the ground surface 44 of the well 25. The tubing string extends from the discharge outlet and orifice to and through the formation 45. A conventional valve 50 may be used on outlet 49 to stop the well or cap it in as desired.

An upper stop 51 is so located within the tubing string interior 47 so that the top of the valve sealing subassembly 34 of the apparatus 21 does not rise above the bottom of the discharge orifice 48 where that orifice opens into the interior 47 of the string 33.

The lower collar stop is a conventional collar stop (such as in United States Patents 2,213,580 or 2,352,612) and is located slightly above the top of the production zone formation 45 and below the usual top level, 60, of the oil or other fluid 61 within the well tubing.

This conventional collar stop is positioned between the bottom of one length of tubing as 21, and the top of another length of tubing as 42, in the space between the collar stop in the preferred embodiment.

In operation of the apparatus of this invention, the device 21 moves between the bottom stop 55 and the upper stop 51. Firstly, a bottom stop as 55 is set in the well tubing. This stop is set at a level sufficiently below the initial top level of oil 60 in the well for continued repeated location of a piston plunger as 21 with the top of its sealing subassembly 34 below the top level 60 of the oil or fluid 61 in said well to be below the top of the level of said fluid or oil allowing for the fall of said level during production of gas and fluid from said formation. However, the level of the stop 55 is located so that the bottom of the sealing subassembly 34 of apparatus 21 is maintained above the top of the level of the perforations as 46 in the tubing.

The apparatus 21 with its sealing subassembly 34 in the expanded condition shown in FIGURES 5, 7, and 15 smoothly and slidably fits into the interior of the tubing in which it is intended to operate, as 41, and forms a resilient yet gas-tight seal therewith. In operation the apparatus 21 is placed in the well string 23 with the sealing subassembly in its contracted condition as shown in FIGURES 1, 6, 8, and 16. The apparatus 21 with the sealing subassembly 34 in its contracted condition then drops from near the top of the well, as shown in position 64 in FIGURE 6, to the lower portion of the well, as shown at position 66 in FIGURE 6, above yet near the lower lower stop 55. In travel from the position 64 to 66 the valve sealing subassembly is in its contracted position, as shown in FIGURES 1 and 6 and provides, as also shown in FIGURES 8 and 16, a minimum transverse cross-section. This reduced cross-section provides for an external bypass of fluid past apparatus 21 and a minimum of resistance to the passage of said apparatus 21 through upflowing gases and well fluids. This passage is further improved by the streamline shape of the longitudinal section of the apparatus 21, which longitudinal section is shown in FIGURE 1.

At the lower position, as 66, the bottom tip 68 of the rod 70 of the piston subassembly 32 projects below the bottom of the frame subassembly 30 in the manner shown in FIGURES 1 and 6. The rod-holding subassemblies 107 and 109 of the sealing subassembly serve to hold the rod and sealing subassemblies in the position thereshown or below described.

The space 100 between the periphery of the contracted sealing subassembly elements and the interior surface of the tubing permits a rapid fall of the tool 21 down the tubing notwithstanding a concurrent substantial upward flow of gas. Accordingly the apparatus permits a continued and uninterrupted flow of gas from the well 25 notwithstanding the downward travel of the apparatus 21 therethrough.

The apparatus 21 falls freely through the well tubing and the oil in the tubing until it meets the top of the lower stop 55. The impact of the movement of the tool 21 against the stop 55 on the projecting pin 68 overcomes the force of the rod-holding subassemblies 107 and 109 holding the piston and sealing subassemblies in the position shown in FIGURES 3 and 4 and the end 68 of the rod 70 is driven inward and upward into the frame subassambly to the position shown in FIGURES 1 and 2. This movement of the rod 70 from the position shown in FIGURES 1 and 6 to that shown in FIGURE 4 releases toggles as 411 and expands the sealing subassembly to its sealing position across the interior of the tubing as is shown in FIGURES 5, 7, and 15. The fall of the plunger down the well and contact with the lower stop 55 thus results in automatically rearranging of the sealing subassembly components at the bottom of the well and effects a substantial gas-tight seal across the tubing, and below the top level 60 of the oil and/or other fluid in the tubing.

The orientation of the sealing subassembly components as shown in FIGURES 5, 7, and 15 blocks the free upward passage of the gas and oil. The gas pressure of the formation gas below the expanded sealing subassembly 34 then drives the expanded plunger 21 with a load of fluid and/or oil as 83 thereabove from a position 81 near the bottom stop up the well to an upper position 85 as shown in FIGURE 6. This oil thus carried up the tubing by apparatus 21 is unloaded from the well at position 85 near the top of the well into a collector tank, or line 87, through the well discharge 49.

Figure 3:
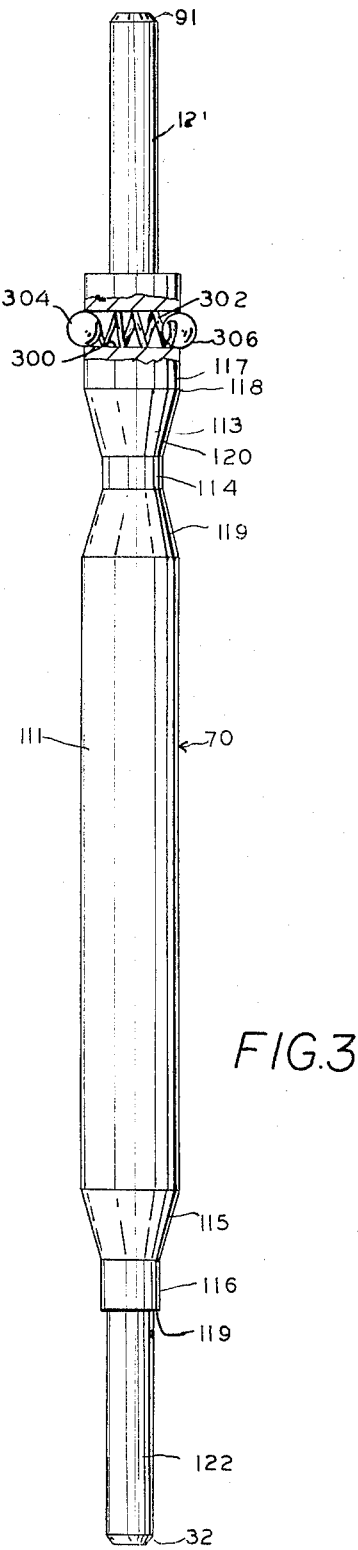
FIGURE 3 is a side view of rod 70 and partly in section.
Figure 4:
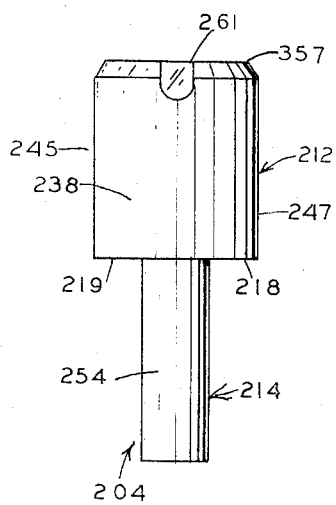
FIGURE 4 is a plan view of the outer surface of upper T-shaped element 204.
Figure 9:
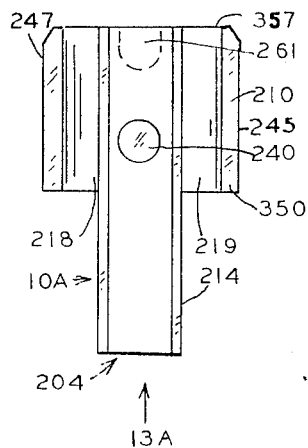
FIGURE 9 is a view of the interior surface of lower T-shaped sealing element 204 as seen along the direction of the arrow 9A in FIGURE 10.
Figure 10:
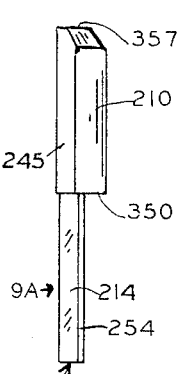
FIGURE 10 is a side view of the lower T-shaped sealing element 204 as seen along the direction of the arrow 10A in FIGURE 9.

After the load of oil has been discharged the continued upward motion of the plunger 21, which motion is due to that the plunger is still impelled by the pressure of the gas 89 therebelow, to the position 64 whereat the upper stop 51 forcefully contacts the upwardly projecting tip 91 of rod 70 as shown in FIGURE 5. The striking of the projecting tip 91 with the top stop overcomes the positioning force of the rod-holding subassemblies 107 and 109 and moves the rod 70 of the piston subassembly downward and into the frame subassembly 30 as shown in FIGURES 3, 4, and 6, and as below described, causes the sealing subassembly 34 to assume its contracted condition. This forceful contact at the position 64 thus automatically rearranges the components of the sealing subassembly relative to the frame sub assembly from that arrangement thereof shown in FIGURES 5, 7, and 15 to that to that shown in FIGURES 6, 8, and 16. This removes the seal theretofore effected by the subassembly 34 across the tubing and interior of the tubing string.

The weight of the plunger 21 then drives that plunger from position 64 toward the bottom of the well 25. The small cross-section of the plunger apparatus relative to the internal cross-section of the tubing, as shown in FIGURES 16 and 6, especially coupled with the fact that the space 100 available for passage of fluids such as well gas, oil and water, past the plunger 21 is unobstructed and permits straight-line flow of such fluids past that plunger. This provides that the plunger 21 travels down the well in 6 minutes to a depth of 6,000 feet in 2½-inch tubing with a great velocity even in wells that produce 1,000,000 cubic feet of gas per day against a line pressure of 500 to 550 p.s.i. and permits that downward passage of plunger 21 without interfering with the concurrent upward flow of gases from the formation 45 and out of the well tube discharge 48.

The structure of the piston 21 below described permits that it be relatively light in weight although extremely sturdy in order to perform its intended function of rapid downward passage through the well to re-form an effective yet flexible seal across the bottom thereof and, because of such light weight, to require a minimum of pressure for upward drive thereof by the formation gas.

On return to the bottom stop 51, plunger 21 is again located below the top level 60 of the fluid and/or oil, 61, in the well and the cycle of operation above described for movement of the plunger 21 and the fluild thereabove as 83 is again repeated.

The simple sturdy structure of this apparatus with relatively large component pieces permits the absorption by the apparatus of the impact resulting from repeated rapid falls through great heights repeatedly without damage to this apparatus.

The collar stops 51 and 55, have, at their point of contact with the top end 91 and bottom end 68 of the rod 70 a greater width than the diameter of those rod ends. Accordingly, the movement of the piston rod 70 is limited to the amount by which the ends thereof, as tip 68 and tip 91, project beyond the top edge 102 and bottom edge 104 of the frame subassembly 30. Accordingly, after such limited motion of the rod 70, the remainder of the impact due to the motion of the apparatus 21 is absorbed by the frame subassembly 30 and, more particularly, its top edge 102 or bottom edge 104, and the movement of the rod 70 is limited by shoulders 153 and 164 and 117.

The piston assembly 32 comprises rod 70 and upper rod-holding subassembly 107.

The rod 70 comprises, all firmly joined together as one integral piece, a central cylindrical section 111, an upper frusto conical section 113 and a lower frusto conical section 115, an upper locking shoulder 117, an upper point shaft 121, and lower point shaft 122. The upper point shaft 121 is a solid cylindrical shaft with a projecting tip 91. The upper locking shoulder is a right cylindrical member of larger diameter than the point shaft 121 and provided with a cavity and resilient locking means, below described, forming part of the upper rod-holding subassembly, 107. The upper frusto conical section 113 is a right cylindrical cone and is coaxial with both the cylindrical shoulder 117 and the upper point shaft 121. The outer diameter of the frusto conical section 113 meets with the outer periphery of section 117 at the edge 118. The bottom portion of the frusto conical portion or section 113 is joined by edge 120 to cylindrical section 114 and section 114 is coaxial with and firmly joined to the sturdy solid cylinder 111 by a conical portion 119. Cylindrical section 114 has a smaller external diameter than the edge 118. The difference between these diameters of sections 114 and 117 is related to the movement of the sealing subassembly components as below described. The solid cylinder 111 at its lower edge 112 is joined to a solid frusto conical section 115 which is a solid piece of steel with the periphery of a cone, which right cylindrical cone has a conical surface which has a central axis which is the same as the axis of the cylindrical portion 111. The surface of the frusto conical portion 115 has the same slope relative to its central axis as does the surface of frusto conical section 113 to its axis. The bottom edge 116 of the portion 115 joins a cylindrical portion 116 of the same size as the cylindrical portion 114. The bottom of solid cylindrical portion 116 is a shoulder 119 which has a right cylindrical outer surface of solid steel.

This lower locking shoulder is firmly attached to the cylindrical shaft point 122 which has a smaller external diameter than the locking shoulder to provide for the locking action below described. The lower point shaft 122 is cylindrical and coaxial with elements 119, 116, 115, 111, 114, 113, 117 and 121, all of which elements are coaxial with each other. The point shaft 122 terminates in a lower point 32 which, in the position shown in FIGURES 1 and 5, projects below the lower edge 104 of the frame subassembly 30. The upper extremity or tip 91 of the upper point shaft 121 projects above the shoulder 102 of the frame subassembly 30 in the position of parts shown in FIGURES 5, 8 and 15 by the same amount as the point 32 projects in the position shown for the contracted condition of the seal subassembly shown in FIGURES 1, 6, 8 and 16.

The frame subassembly 30 comprises an upper or fishing neck portion 130, a central body portion 132 and a bottom portion 134.

In serial order from the top edge 102 of the frame subassembly, the fishing neck portion 130 comprises a cylindrical fishing head 141, a fishing head shoulder 143 and a fishing neck waist 145. The fishing neck waist is joined to the fishing neck head by the shoulder 143. The waist is joined to the body portion 132 by the body shoulder 147. The fishing neck portion is provided with a central cylindrical cavity 149 at the center of said neck in which cavity 149 the upper locking cylinder 117 of the rod 70 is located and moves. A hollow cylindrical portion 151 of cavity 149 holds a shouldered locked cap 153. The locked cap has a central longitudinal cylindrical cavity 155 therein wherein the point shaft 121 of the rod 70 is firmly yet slidably supported. The point shaft 121 has a smooth yet slidable fit in that cavity 155. The inner portion of the fishing neck portion 130 is also provided with other annular grooves and orifices hereinbelow described which cooperate to form the upper rod-holding subassembly 107 below described. The locking shoulder 117 fits into the narrowest portion of the cavity 149 with a smooth yet readily slidable fit. Cap 153 is a removable sleeve: its external surface is the same size as the interior of cavity 149. The interior surface 155 thereof provides a sliding fit to shaft 121. The cap 153 has an exterior recesses 156 and 156' which mates with recesses as 158 and 158' therefor in the fishing head 141 to engage a locking pin 170 and 171 which hold cap 153 in place.

The bottom portion 134 of the frame subassembly comprises a sturdy thick-walled outer sleeve 160 traversed by a central longitudinally extending cavity 161, at the lower end of which cavity is provided with a shoulder 164.

The portion 134 has a cylindrical passageway 166 therethrough which is coextensive and coaxial with cavity 161 and smoothly, yet slidably, fits about the lower point shaft 122 to permit reciprocation of said point shaft within said passageway. The shoulder 119 of piston 70 fits against the shoulder 164, the recess therefor in the sleeve 160.

The body portion 132 of the frame subassembly 30 comprises an upper rocking arm lever-support portion 173, a middle bridging portion 175 and a lower rocking arm lever-support portion 177. The upper lever-support portion is continuous with and firmly attached to the fishing neck portion 130. The lower lever-support portion 177 is continuous with and firmly attached to the hollow or sleeved portion 160 of bottom portion 134. The upper lever-support portion 173 and lower lever-support portion 177 are joined by the cylindrical bridging portion 175 and are securely attached thereto inasmuch as the entire frame may be formed in one piece of metal except for the cap 153. The middle bridging portion cylinder 175 has an inner cylindrical chamber 179 which extends through portion 173 and connects with cavities 149 and 161 within which the central cylindrical portion 111 of the rod 70 is slidably yet firmly located. The outer surface of the bridging portion 175 is cylindrical and provided with two annular groups of spring holes, one group of such holes, as 188, comprises spring holes 180, 181, 182, 183 to locate therein springs such as 184, 185, 187, and 187, respectively in an upper ring or group 188 of springs and spring holes therefor, for one end of the T-shaped sealing elements 202, 204, 206 and 208.

A second group or ring of springs and spring holes 196 is also provided in the bridging member 175 for action on the T-shaped members 220, 222, 224 and 226. The members of this particular group, holes 401, 402, 403, 404 and springs 405, 406, 407, 408, are shown in FIGURES 15 and 16. These spring holes in rings 188 and 189 are equally spaced (at 90°) from each other The spring holes in ring 196 are equally spaced at 90° from each other. Each of the spring holes 400, 401, 403, and 404 seat one end of each of the springs 405, 402, 406, and 407, respectively; the other end of each of such springs seats in the spring hole of a T-shaped member as 226, 220, 222, and 224, respectively.

The holes of ring 196 are each halfway between the holes of ring 188. The upper rocker arm lever-support section 173 is provided with four equi-spaced radially extending lever slots as 410, 412, and 414 (which are shown) as well as another lever slot, opposite to lever slot 412 which particular slot is not shown in the drawings. These slots extend from chamber 179 to the surface of section 173. In each of these slots a rocker arm lever such as 411 (in slot 410) and 413 (in slot 412) and 415 (in slot 414) is pivotally supported. Cylindrical pivot as pins 416 and 418 pivotally support each of the rocker arm levers as 411 and 415 respectively and are themselves firmly supported in the upper lever support section 173. Pin 416 is provided for rocker arm lever 411, and pin 418 is provided for lever 415, and similar pins are provided for the other levers to permit such levers to rotate about the axis of the pivot pins therefor.

The lower lever-support section 177 is provided with four equispaced radially extending lever slots, as slots 420 and 422 which are shown as well as other lever slots opposite to slots 422 and 424 which particular slots are not shown in the drawings. These slots extend from chamber 179 to the surface of section 177. In each of these slots a lever such as 423 in slot 422 is pivotally supported on cylindrical pivot pins as 426. The pins as 426 pivotally support each of the levers as 421 and similar pins are provided for all said levers to permit such levers to rotate about the axis of the pivot pins therefor. The lengths of the pivot pins as 416 and 418 are each firmly yet releasably secured into the adjacent lever support portion 173 of the frame subassembly in a plane normal to the longitudinal axis of the rod 70 and at the same distance from said axis. The lengths of pivot pins as 426 are each firmly yet releasably secured into the portion 177 in another plane parallel to that of the length of pins 416, 417, 418 in a plane normal to the longitudinal axis of rod 70 and at the same distance from said axis.

Each rocker arm as 411 is provided with a pin as pin 416 for arm 411. All the levers are identical in shape and size to each other; all the lever slots are similarly identical in their shape and size; all the lever support pins are located the same radial distance from the central longitudinal axis of the rod 70.

The sealing subassembly 34 comprises a first series of like generally upright T-shaped elements 202, 204, 206, 208 in an expansible nesting relationship with a second series of like elements 220, 222, 224, 226, generally shaped like an upside down letter T. The elements 202, 204, 206 and 208 are curved in section (as in FIGURE 7). Each sealing element as 204 comprises upper, transversely extending on apparatus 21 curved wide head portion 210 of rectangular outline and generally uniform thickness and a lower, narrow cantilever portion 214 of rectangular outline and uniform thickness and extending longitudinally on apparatus 21 and at a right angle to the length of portion 210. One end of portion 214 joins to the middle inner surface of portion 210 and the other end of portion 214 extends beyond the outline of portion 210. The head portion 210 comprises a central portion and two lateral or wing portions 218 and 219. Each cantilever member as 214 that extends the full length of each such T-shaped element as 204 and T-shaped elements as 204 are symmetrical about their central longitudinal plane as 9B–9C (FIGURE 13) of item 204. The thickness of the intermediate member 214 is the same as the thickness of the lateral or wing portions, as 218 and 219 of the head portion 210.

The inner surface of each head portion of the T-shaped elements as 204 is provided with a spring hole for the location of a spring, as hole 240 in portion 210. Element 208 has corresponding spring hole 243 corresponding to the spring hole 240 in element 204.

Figure 11:
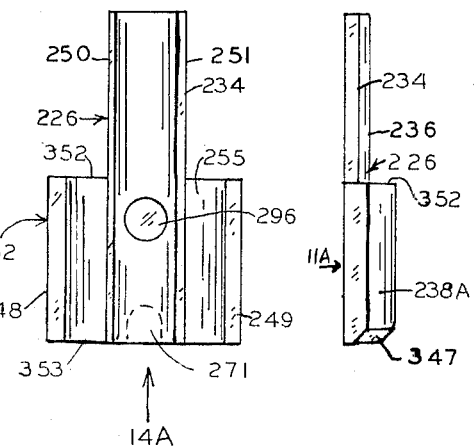
FIGURE 11 is a view of the interior surface of one of the T-shaped sealing elements 226 as seen along the direction of the arrow 11A in FIGURE 12.
Figure 12:
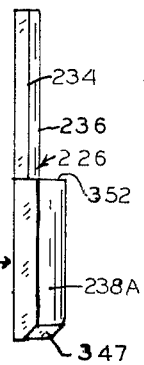
FIGURE 12 is a side view of the T-shaped sealing element 226 as seen along the direction of arrow 12A in FIGURE 14.

The elements resembling the upside down letter T and refrred to as T-shaped elements 220, 222, 224 and 226 are referred to as T-shaped because, as shown for element 226 (which is shown in some detail in FIGURES 11, 12 and 14) such element consists of a lower wide portion 232 corresponding in size and shape to element 210 of element 204 with a cantilever portion 234, corresponding in size and shape to element 214, connected to and extending therefrom as in element 204. Elements 220, 222, 224, and 226 are identical to each other and the description given for one such element, i.e., 226, is applicable to corresponding elements. Elements 202, 204, 206, 208, 220, 222, 224 and 226 are all interchangeable with each other. Accordingly, the lower wide portion 232 of the element 226 has a curved cross section identical to that of portion 210 of element 204 and arm 234 is identical in cross section to portion 214. Each T-shaped element 220, 222, 224, and 226 has a spring hole as 293, 294, 295 and 296 respectively for a spring 402, 406, 407, 408, respectively. The head portion of each T-shaped element is provided with a rocker arm lever engaging recess, as 261 in element 204, 261', 208, and 271 in head of element 226 and 271' in element 222.

The springs 184, 185, 186, and 187 fitting into the spring holes of hole group 188 urge the elements 202, 204, 206, and 208 apart from element 175; similarly the springs 405, 406, 407, 408 in spring holes of group 189 urge elements 220, 222, 224, and 226 outwardly of element 175. This outward urging is resisted by the inner wall 197 of the tubing when the apparatus is in its expanded condition, as in FIGURES 5, 7 and 15 and thereby a resilient seal is formed between the subassembly 34 and inner wall 197 of the tubing string 23.

When the apparatus 21 is in its contracted condition, as in FIGURES 5, 7 and 15, the rocker arm levers as 411 and 414 are actuated by portion 117 of the rod 70 and overcome the outward force of said springs on sealing subassembly components 202, 204, 206, 208 and 220, 222, 224 and 226.

Each of the sealing elements has an inner curvature which matches the outer curvature of the bridging portion 175. The outer surface of each element, as 238 and 238A of elements as 204 and 226 has the same radius of curvature as the inner surface 197 of the tubing as 41 of string 23 in which the tool 21 is used. The width as measured from one lateral edge 245 to another lateral edge 247 of element 210 is sufficiently of such size that when the elements 204, 206 and 208 nest as shown in FIGURES 6, 8, and 16 the cape-shaped head portions of upside down T-shaped portions as 232 interdigitate with cape-shaped head portions as 210. The portions such as 214 and 234 all have the same cross-section. Similarly, the cape-shaped sections 210 and 232 have the same cross-section. Accordingly, the cantilever arm as 234 of the element as 226 nest below the lateral cape-shaped portions of adjacent head portions of 208 and 206 and the portion 214 of the element 204 nests between the surrounding cape portions of elements 222 and 224.

The maximum width between the lateral edges as 245 and 247 of each of the head portion elements as shown in FIGURE 4 is limited to that of an arc covering 90° of a circle whose diameter is that of the portion 173; which is the same as that of 177.

The limited width of the head portion of the sealing elements permits their contraction to the nested position of reduced cross section shown in FIGURE 8. Similarly, the distance between the lateral edges 248 and 249 of the head portion of upside down T-shaped elements such as 226 permit the nesting of those similarly shaped and sized elements, in contracted condition of the subassembly 34, as shown in FIGURE 16. The width of the arm 234 and of the bridging element 214 are such as to permit their nesting as shown in FIGURES 16 and 8. Nevertheless, the width of arm 234, i.e., between edges 250 and 251, is such as to permit effective blocking thereby of the space between the edges of the adjacent cape-shaped or head elements of 206 and 208 as shown for element 234 in FIGURE 7. This accordingly provides a substantially gas-tight seal between one sealing element and the next notwithstanding the radial expansion of the ring of upper T-shaped elements and the ring of lower T-shaped elements during the operation of this device. The outer surface as 254 of each cantilever element as 214 of the upper ring of elements 202, 204, 206, 208 matches the internal curvature of the inner surface as 255 of the wing portion of the adjacent T-shaped elements, and thereby provides a smooth contact and seal therewith and an even urging outwards by the various springs 184–187 and 402, 403, 404, and 405. Each of the T-shaped elements is provided at one end of the cape element with a pair of recesses as 261 for element 204, and recess 263 for element 202, and recess 267 for element 208.

Accordingly, motion of the rod 70 urges all the rocker arm tongues inward concurrently. The movement of the tongues inward moves all the T-shaped elements inward. The cantilever elements as 214 and 234 which are restrained from outward movement by the cape portion of the surrounding wing portion as 218 or 219 of the adjacent T-shaped elements are urged outward by their springs and closely follow the control provided for the expansion and contraction of those heads by the levers as 411, 413, 415, etc. which in turn are controlled by the motion of the rod 70.

Figure 13:
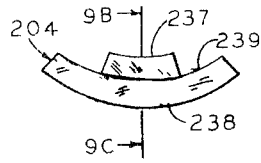
FIGURE 13 is an end view of the sealing element 204 as seen along the direction of the arrow 13A in FIGURE 9.
Figure 14:
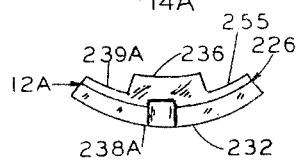
FIGURE 14 is an end view of the sealing element 226 as seen along the direction of the arrow 14A in FIGURE 11.

The levers as 411, 413, 415, 421, 423, and 425 do not permit sealing subassembly components to move as far out as the thickness of the sealing subassembly components, i.e., the thickness from inner surface 237 to outer surface 238 of element 204, although usually such elements are permitted to travel no further outward (towards surface 197) than the thickness of the enlarged portion of the sealing subassembly components, i.e., the distance from surface 239 to surface 238 on FIGURE 13 or corresponding thickness 239A to 238A on FIGURE 14.

The amount of motion provided for by the levers is ⅜″ change in diameter in the preferred embodiment herein described in particular detail for use in pipe of 2½-inch nominal internal diameter. The actual requirement for motion through the tube is only ⅝-inch change to the actual 2.44-inch diameter of such pipe so this structure allows a somewhat greater increase change in diameter of the sealing subassembly than the maximum internal diameter of the tube. This results in a firm yet resilient fit of the sealing elements with the tube at all times, notwithstanding the sealing subassembly also is readily resiliently contracted to compensate for the usual variations in internal diameter of such tubing such as to the 2.35-inch drift diameter of such tubes. The length of the sealing subassembly 34 also avoids any loss of pressure when passing joints between tubing joints.

Control rod 70 is provided with an upper rod-holding subassembly 107. Subassembly 107 comprises element 117 and recesses 308 and 309. Element 117 is provided with a transverse cylindrical hole, 300 therethrough. A spring 302 is provided within that hole and spherical steel locking balls 304 and 306 are located within that hole: These balls are smoothly slidably movable along hole 300. The locking balls 304 and 306 are each slightly smaller in diameter than the internal diameter of the hole 300 which allows the balls to sink into that hole during the motion of the rod from the position shown in FIGURES 1 and 6 to the position shown in FIGURE 5.

Lower annular recess 308 is provided for locating the balls 304 and 306 in their position shown in FIGURES 1 and 6. Additionally, upper annular recess 309 is provided for location of said locking balls in the position shown for FIGURE 5. The recesses 308 and 309 have a semi-circular cross section that matches the size and shape of balls 304 and 306. The longitudinal spacing of these recesses 308 and 309 is the distance of the longitudinal movement of the rod 70 in roving from the position shown in FIGURE 7 to that in FIGURE 1. These two recesses 308 and 309 in combination with spring 302 and balls 304 and 306 provide a resilient snap action to hold the rod 70 in the lower position shown in FIGURE 7 or in the upper position shown in FIGURE 5. It will be noted that the lower surface 321 of the shoulder 119 meets the top of the shoulder 164 when in its lowered position as shown in FIGURE 1. This provides for receipt of the impact of the shock of upward motion of tool 21 against the upper stop 533 as in FIGURE 6 by the shoulder 164 and the passage of such shock to the bottom of the bottom portion 134 of the frame subassembly.

On the motion of rod 70 to its upper extremity to the position shown in FIGURE 5 the bottom edge 104 of the frame 30 distribute the impact of the shock met on impact of the tool 21 with the lower collar stop 55 as shown in FIGURE 6 at position 66.

The resilient suspension of the T-shaped elements on their springs and the close fit of the squared edges of head elements as 232 against the squared edges of adjacent head element as 210 and 212 in the expanded condition of the sealing subassembly provides a firm diametral gas tight seal nothwithstanding the relative looseness of fit prior to application of gas pressure to the expanded seal subassembly prior to the beginning of upward motion of apparatus 21 from position 66. The longitudinal peripheral spaces between elements 202, 204, 206 and 208 are not contiguous with the peripheral longitudinal spaces between sealing elements 220, 222, 224, 226 and those sealing elements do smoothly fit the wall 197. This improves the diametral sealing action of these sealing elements. Also, the external surfaces, as 236, on each of the upside down T-shaped elements cantilever portions form a good radial gas seal against each of the adjacent surfaces as 239 of the head of the T-shaped elements adjacent thereto. Also, the upper end edge of the T-shaped elements 202, 204, 206 and 208 fit smoothly against the wall 333 of the frame body.

All the sealing element rocker arms as 411, 413, and 423 are all identical in shape and size. Each rocker arm as 411 comprises a smoothly rounded finger portion 280 which is at one inner end of a rigid sturdy sensing arm 281. The arm 281 has a pivot hole 282 therein for smooth pivotal reception of a cylindrical pivot pin as 416 about which such arm smoothly pivots. The tongue portion 283 of the arm 411 extends outwards to the tongue of said toggle, as 262. The tongue 262 contacts the bottom of the recess as 267 corresponding thereto on the center of the outer edge of the outer surface of sealing member 208 and, in the contracted position of the sealing subassembly, urges that particular portion of the member 208 and also the portion of members 226 and 228 below the lateral portion of head of member 208 inwards toward the rod 70. The finger 280 is guided in its position accordingly by the location of the rod 70. In the lowered position of the rod 70 shown in FIGURE 1, the finger 280 and all corresponding fingers of similar toggles are forced radially outward and the tongues, as 262, 264, 265 and 423 are forced inward and bring inward the corresponding engaged plate, as 202 for tongue 264, 204 for tongue 265, and 222 by tongue 423. The plates 220, 224 and 226 are controlled in their position by their springs (184, 185, 186, and 187) which urge them outward and tongues as described for element 222.

With the finger portion of the rocker arms for elements 220, 222, 224 and 226, such as 423 contracting conical portion 115 of or portion 111 of rod 70 when finger portion as 280 contact conical portion 113 of or portion 117 of rod 70, respectively. Thereby all the seals of subassembly 34 move in and out together as rod 70 moves up and down frame 30. The tongue 262 of element 411 fits into the recess 267. The tongue 264 fits into the recess 263. The tongue 265 of the element 415 fits into the recess 261 of element 204. The similar tongue 272 of the element 423 fits into the recess 274 of element 222. Similarly, the similar tongue of a similar rocker arm lever fits into the recess 271 of the element 226 and similar tongue of a similar toggle fits into each of the similar recesses of the elements 224 and 220.

The arrangement of the conical portions of the rod 70 is such as shown in FIGURE 3, that on movement downward of the control rod 70 the fingers as 280 of the rocker arms follow the contour of that rod and are urged into the position shown in FIGURE 1 for arm 411.

The outer wide edges of all the T-shaped elements, as 347 and 357 of elements 204 and 226, respectively, are bevelled to facilitate the upward movement of the expanded sealing subassembly past proturberances and/or irregularities in the tubing and to permit the ready reversibility of the sealing elements parts for ease and economy in assembly.

The central transverse diametral surfaces, as 350 and 352 of each of the cape-shaped components of each T-shaped elements as elements 210 and 232 are smooth and flat to form a firm relatively gas-tight seal with adjacent diametral surfaces therebelow such as 352 of an adjacent element such as 232, which surfaces are also flat and smooth, on urging of the longitudinally movable lower upside down T-shaped elements against the upper T-shaped elements by gas pressure exerted against the lower elements through the spaces as 355 and 356 between the cape or head portions of T-shaped elements in the expanded condition of the sealing subassembly. Such gas-tight seal is maintained notwithstanding the variation in internal diameter of the tubing and the effective external diameter of the sealing elements which are resiliently urged against the interior of such tubing.

A similar smooth flat surface is formed at the top edge of each T-shaped element, as 357 on element 204, whereby to form a smooth yet relatively gas-tight seal against the flat smooth surface 333 of the frame subassembly with such elements as 202, 204, 206, and 208.

The length of the exterior sealing elements 204, 206, and 208 and 220, 222, 224, 226, and 228 is greater than the spaces between successive lengths of tubing joined by the intermediate collar stop; this avoids any leakage of gas pressure urging said apparatus 21 upwards as above described past such sealing elements in the neighborhood of a collar stop. The interlocking nesting of the T-shaped elements prevents engagement of any one of such elements with the shoulder of a piece of tubing in the region of the space between tubing lengths at a collar stop. The width of the cape-shaped portions provides a large sealing surface to reduce the effect of wear on the effectiveness of the seal formed by the sealing subassembly 34. The thickness of each of the cape-shaped head portions, e.g. as from surfaces as 239 to surface 238 in element 204 and from surface 255 to surfaces as 238A in element 226, is greater than the intended width of the space 100 in the preferred embodiment above described.

The springs as 185 and 191 for each of the sealing elements of subassembly 34, as element 204, provides a total of 1½ pounds outward force in the expanded condition of those springs, i.e., ¾ pound outward force per spring in the expanded condition shown in FIGURES 1 and 2: the other springs attached to the other sealing elements provide a similar amount of outward force in the same condition. Thus, springs 187 and 194 similarly provide a total of 1½ pounds outward force in the condition and position shown in FIGURES 1 and 2. In the expanded condition of the subassembly 34, as shown in FIGURE 1, the levers, as 411, do not bear the force of the springs urging the seals outward because the fingers 280 are then out of contact with the reduced cross-section portion 114 of rod 70 and the springs resiliently urge the corresponding seal elements, as 202, 204, 206, 208, 220, 222, 224 and 226 into contact with the wall 197 with about ¾ pound force per spring.

The usual gap between adjacent pipes as 40 and 41 in a string as 23 is about an inch at couplings as 42: each of the sealing element components of subassembly 34 in contact with the interior surface 197 of the pipe or string 23 have a greater length than one inch as well as that the length of the total expanded subassembly 34 is almost 4 inches long as above listed, described, and hence the apparatus 21 suffers no interference in its operation due to the usual gap between the sections or pipe at the couplings.

Although in accordance with the provisions of the patent statutes, particular preferred embodiments of this invention have been described and the principles of the invention have been described in the best mode in which it is now contemplated applying such principles, it will be understood that the operations and construction shown and described are merely illustrative and that my invention is not limited thereto and accordingly, alterations and modifications which readily suggest themselves to persons skilled in the art without departing from the true spirit of the disclosure hereinabove are intended to be included in the scope of the annexed claims.

I claim:

1. An oil well apparatus providing for an external bypass of fluid therepast for operation in a well tubing comprising a frame with a longitudinally extending recess therethrough, rod holding means in said frame, said rod being slidably held in said recess in one of two positions, toggle means actuated by said rod and pivotally attached to said frame for motion of one portion thereof inward and outward on upward and downward motion of the rod with respect to said frame, two series of sealing elements each of which series circumscribe the periphery of said frame, each of the elements of each of said series having a spring nested therein and said spring pressing each of said elements outward, one edge of one portion of said element engaging said toggle, the other end of said element engaging an element of said other series engaged by a toggle, spaces between the elements of one series not contiguous with spaces between elements of the other series, said series being adjacent each other, said rod having portions of different thickness along its length, said springs urging said extensible member into contact with toggles and said toggles into contact with said rod, and resiliently actuated releasable locking means between said rod and said frame.

2. Apparatus as in claim 1 wherein the extensible and retractable means comprise two series of interdigitating elements, the members of the first of said series each comprising a T-shaped element with its outer surface curved to match the inner surface of the tubing, said elements being joined to a cantilever element at one end thereof, the second series of elements comprising a sealing element with the same curvature as the sealing elements of said first series and a cantilever member extending longitudinally at one end thereof, and wherein the cantilever elements of the second series and the cantilever elements of the first series extend in opposite direction have the same transverse cross section, wherein the thickness of each of the sealing members exceeds the distance between the inner wall of the tubing and the outer diameter of the frame.

References Cited by the Examiner
UNITED STATES PATENTS

| | | | |
|---|---|---|---|
| 2,674,951 | 4/1954 | Zaba | 103—52 |
| 2,684,633 | 7/1954 | Knox | 103—52 |
| 2,762,310 | 9/1956 | Eklund | 103—52 |

MARK NEWMAN, *Primary Examiner.*

W. J. KRAUSS, *Assistant Examiner.*